United States Patent
Kumai

(10) Patent No.: US 8,416,371 B2
(45) Date of Patent: Apr. 9, 2013

(54) POLARIZATION DEVICE, METHOD OF MANUFACTURING THE SAME, LIQUID CRYSTAL DEVICE, AND ELECTRONIC APPARATUS

(75) Inventor: Yoshitomo Kumai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 13/159,274

(22) Filed: Jun. 13, 2011

(65) Prior Publication Data

US 2011/0310329 A1 Dec. 22, 2011

(30) Foreign Application Priority Data

Jun. 16, 2010 (JP) .................................. 2010-136851

(51) Int. Cl.
*G02F 1/1335* (2006.01)

(52) U.S. Cl. .......................................... 349/96; 349/201

(58) Field of Classification Search .................... 349/96, 349/201
See application file for complete search history.

(56) References Cited

U.S. PATENT DOCUMENTS 7,233,563 B2   6/2007   Ueki et al.

FOREIGN PATENT DOCUMENTS

| JP | 10-073722 | 3/1998 |
| JP | 2005-37900 | 2/2010 |
| JP | 2010-072591 | 4/2010 |

*Primary Examiner* — Phu Vu
(74) *Attorney, Agent, or Firm* — Workman Nydegger

(57) ABSTRACT

The wire grid type polarization device includes a substrate, and a metal layer formed on one face of the substrate in a substantially stripe shape in a plan view, a first dielectric layer provided on two side faces opposite to each other among a plurality of side faces of the metal layer and in a top part of the metal layer, and a second dielectric layer provided on the first dielectric layer. A substrate side end portion of the second dielectric layer is located between the one surface of the substrate and the top part of the first metal layer.

21 Claims, 7 Drawing Sheets

POLARIZATION DEVICE, METHOD OF MANUFACTURING THE SAME, LIQUID CRYSTAL DEVICE, AND ELECTRONIC APPARATUS

BACKGROUND

1. Technical Field

The present invention relates to a polarization device, a method of manufacturing the polarization device, a liquid crystal device, and an electronic apparatus.

2. Related Art

As a light modulating device in various electro-optical apparatuses, a liquid crystal device has been used. As a structure of the liquid crystal device, a structure in which a liquid crystal layer is interposed between a pair of substrates oppositely disposed has been widely known. In addition, a configuration, which includes a polarization device that allows a predetermined polarized light to be incident to the liquid crystal layer, and an alignment film that controls an arrangement of liquid crystal molecules at the time of not applying a voltage, is typical.

As the polarization device, a film-type polarization device manufactured by extending a resin film including iodine or a dichroic dye in one direction and aligning the iodine or dichroic dye in this extension direction, and a wire grid type polarization device formed by lining a nano-scaled metal fine wire on a transparent substrate are known.

The wire grid type polarization device is made from an inorganic material, such that the polarization device has the merit of superior heat resistance, and is used in a field where heat resistance is especially necessary. For example, the polarization device is used as a polarization device for a light valve of a liquid crystal projector. As such a wire grid type polarization device, for example, there is disclosed a technique described in JP-A-10-73722. In addition, as a wire grid type polarization device in which a reflectance is suppressed, for example, there is disclosed a technique described in JP-A-2010-72591.

In JP-A-10-73722, a metal lattice on a substrate is oxidized by a heat treatment and thereby an oxide film is formed on the metal lattice surface, such that it is possible to provide a polarization device having superior environment resistance. However, in a method disclosed in JP-A-10-73722, a substrate is processed at a temperature of 500° C. or higher, such that cracking or deformation of the substrate is apt to occur. In addition, the metal lattice itself is damaged by heat expansion, and thereby dimension of the metal lattice, such as height and width, which determines a characteristic of the polarization device is changed. Therefore, there is a problem that a polarization characteristic of the polarization device, which is entirely uniform, cannot be shown. Furthermore, there is a problem that when the temperature is raised at the time of operating the liquid crystal device, the property of the metal lattice is changed, such that the polarization characteristic is lowered.

In JP-A-2010-72591, a method of manufacturing a wire grid type polarization device in which a light absorbing layer is provided on a light reflecting layer is disclosed, but there is not disclosed a method of manufacturing a wire grid type polarization device, in which an oxidized film is provided on a top face and side faces of the light reflecting layer, and a light absorbing layer is provided on the oxidized film.

SUMMARY

An advantage of some aspects of the invention is to solve at least a part of the above-described problems.

According to an aspect of the invention, there is provided a polarization device including a substrate, and a plurality of metal layers that is provided on one face of the substrate in a stripe shape and includes a first dielectric layer and a second dielectric layer. An optical absorption rate of the second dielectric layer is higher than that of the first dielectric layer. In two side faces opposite to each other in a plurality of side faces of a first metal layer and a top part of the first metal layer among the plurality of metal layers, the first dielectric layer included in the first metal layer is provided between the second dielectric layer included in the first metal layer and the first metal layer, and a substrate side end portion of the second dielectric layer included in the first metal layer is located between the one face of the substrate and the top part of the first metal layer.

According to this aspect of the invention, it is possible to transmit a TM wave that is linearly polarized light vibrating in a direction orthogonal to an extension direction of the metal layer, and to absorb a TE wave that is linearly polarized light vibrating in the extension direction of the metal layer.

That is to say, the TE wave incident from the second dielectric layer side of the substrate is attenuated by an optical absorption effect of the second dielectric layer, and a part of the TE wave passes through the second dielectric layer and the first dielectric layer without being absorbed and is reflected from the metal layer (functions as a wire grid). When the reflected TE wave passes through the first dielectric layer, a phase difference is applied thereto, and the reflected TE wave is attenuated by an interference effect and the remainder thereof is absorbed by the second dielectric layer. Therefore, due to the above-described attenuation effect of the TE wave, it is possible to obtain an absorption type polarization device having a desired polarization characteristic. In addition, both side faces and a top part of the metal layer are covered by the first dielectric layer, such that it is possible to prevent the deterioration of the metal layer, which is caused by oxidation or the like and thereby it is possible to suppress the decrease in a polarization separation function.

In addition, it is preferable that the second dielectric layer includes a first member and a second member, and the first and second members provided to the first metal layer overlap each other over the top part of the first metal layer.

According to this configuration, it is possible to more effectively absorb the TE wave incident from a second dielectric layer side of the substrate.

In addition, it is preferable that the first metal layer is provided at one end side of the substrate, a second metal layer among the plurality of metal layers is provided at the other end side of the substrate, a volume per unit length of the first member provided to the first metal layer is larger than a volume per unit length of the first member provided to the second metal layer, and a volume per unit length of the second member provided to the first metal layer is smaller than a volume per unit length of the second member provided to the second metal layer.

According to this configuration, it is possible to make variance in a sum of the volume of the first and second members, that is, in the volume of the second dielectric layer, small. As a result, in-plane variation in an absorbance rate of the TE wave can be reduced and thereby an optical characteristic uniform over entire surfaces of the polarization device can be realized.

In addition, it is preferable that the plurality of metal layers is formed of a material selected from aluminum, silver, copper, chrome, titanium, nickel, tungsten, and iron, the first dielectric layer is formed of an oxide of the plurality of metal layers, and the second dielectric layer is formed of a material selected from silicon, germanium, molybdenum, and tellurium.

According to this configuration, when the polarization device is used under a high temperature environment, it is possible to suppress oxidation of the metal layer, and thereby it is possible to suppress the deterioration of the polarization characteristic of the polarization device. In addition, it is possible to increase the absorption rate of the TE wave of the absorption type polarization device.

In addition, it is preferable that the first and second members are formed of the same material as each other. According to this configuration, it is possible to increase in-plane uniformity of the substrate in the TE wave attenuation effect. As a result, it is possible to increase in-plane uniformity of the polarization characteristic of the absorption type polarization device.

In addition, it is preferable that in a region between the plurality of metal layers, a groove is formed in the substrate.

According to this configuration, it is possible to reduce an effective refraction index of a boundary region between the substrate and the metal layer, such that the reflection of the TM wave at the boundary region can be suppressed. As a result thereof, the transmittance of the TM wave is increased, and thereby it is possible to obtain a bright polarization device.

According to another aspect of the invention, there is provided a method of manufacturing a polarization device including a substrate, a plurality of metal layers provided on one face of the substrate in a stripe shape, a first dielectric layer provided on a surface of one metal layer among the plurality of metal layers, and a second dielectric layer that is provided on the first dielectric layer and includes a first member and a second member. The method includes forming the first dielectric layer by oxidizing a surface of the plurality of metal layers provided on one surface of the substrate in an oxide gas atmosphere; forming the first member by depositing a material of the first member on the first dielectric layer from a first direction opposite to one side face among a plurality of side faces of the one metal layer; and forming the second member by depositing a material of the second member as an upper layer of the first dielectric layer from a second direction opposite to the other side face opposite to the one side face among the plurality of side faces of the one metal layer.

According to this aspect of the invention, it is possible to make a variance in the sum of the volume of the first and second members, that is, the volume of the second dielectric layer, small. As a result, it is possible to easily manufacture a absorption type polarization device in which in-plane variation in an absorbance rate of the TE wave can be reduced and thereby an optical characteristic uniform over all the surfaces of the polarization device can be realized.

In addition, in this method, the surface of the metal layer is covered by a metal oxide layer having a high density, such that even when the temperature is raised at the time of operating a liquid crystal device or the like in which the polarization device is included, deterioration of the metal layer owing to oxidation or the like does not easily occur. As a result thereof, it is possible to manufacture at relatively low temperatures a polarization device whose polarization characteristic is not easily diminished.

In addition, it is preferable that in the forming of the first member, the material of the first member is deposited on the first dielectric layer so that a substrate side end portion of the first member is located between the one face of the substrate and the top part of the one metal layer, and in the forming of the second member, the material of the second member is deposited as the upper layer of the first dielectric layer so that a substrate side end portion of the second member is located between the one face of the substrate and the top part of the one metal layer.

According to this method, transmittance of the TM wave is increased and thereby it is possible to obtain a bright polarization device.

In addition, it is preferable that in the forming of the second member, the second member is formed so that the second member overlaps the first member over the top part of the one metal layer.

According to this method, it is possible to more effectively absorb the TE wave incident from a second dielectric layer side of the substrate.

In addition, it is preferable that a first metal layer among the plurality of metal layers is provided at one end side of the substrate, a second metal layer among the plurality of metal layers is provided at the other end side of the substrate, a volume per unit length of the first member provided to the first metal layer is larger than a volume per unit length of the first member provided to the second metal layer, and a volume per unit length of the second member provided to the first metal layer is smaller than a volume per unit length of the second member provided to the second metal layer.

According to this method, it is possible to make variance in the sum of the volume of the first and second members, that is, in the volume of the second dielectric layer, small. As a result, in-plane variation in an absorbance rate of the TE wave can be reduced and thereby an optical characteristic uniform over all the surfaces of the polarization device can be realized.

In addition, it is preferable that the plurality of metal layers is formed of a material selected from aluminum, silver, copper, chrome, titanium, nickel, tungsten, and iron, the first dielectric layer is formed of an oxide of the material selected for the plurality of metal layers, and the second dielectric layer is formed of a material selected from silicon, germanium, molybdenum, and tellurium.

According to this method, when the polarization device is used under a high temperature environment, it is possible to suppress oxidation of the metal layer, and thereby it is possible to suppress the deterioration of the polarization characteristic of the polarization device. In addition, it is possible to increase the absorption rate of the TE wave of the absorption type polarization device.

In addition, it is preferable that the first and second members are formed of the same material as each other.

According to this method, it is possible to increase in-plane uniformity of the substrate in the TE wave attenuation effect. As a result thereof, it is possible to increase in-plane uniformity of the polarization characteristic of the absorption type polarization device.

In addition, it is preferable that the oxide gas is ozone gas.

According to this method, it is possible to increase the oxidation rate of the metal layer and thereby it is possible to provide a manufacturing method with a high productivity. In addition, it is possible to increase the density of the metal oxide layer and thereby it is possible to further improve oxidation resistance and abrasion resistance.

In addition, it is preferable that in the forming of the dielectric layer, the metal layer is irradiated with ultraviolet light.

According to this method, decomposition reaction of ozone is promoted, and thereby it is possible to form an oxide film at a low temperature. In addition, the density of the metal oxide layer can be increased, and thereby it is possible to further improve the oxidation resistance and abrasion resistance.

In addition, it is preferable that the method further includes forming a groove in the substrate, in a region between the plurality of metal layers.

According to this method, it is possible to reduce an effective refraction index of a boundary face between the substrate and the metal layer, such that the reflection of the TM wave at the boundary face can be suppressed. As a result thereof, the transmittance of the TM wave is increased, and thereby it is possible to obtain a bright polarization device.

According to still another aspect of the invention, there is provided a projection type display apparatus including a light source; a liquid crystal electro-optical device to which light emitted from the light source is incident; a projective optical system that allows the light passed through the liquid crystal electro-optical device to be incident to a surface to be projected; and the above-described polarization device provided at least one of between the light source and the liquid crystal electro-optical device on an optical path of the light emitted from the light source and between the liquid crystal electro-optical device and the projective optical system on an optical path of the light passed through the liquid crystal electro-optical device.

According to this configuration, the projection type display apparatus includes the polarization device having a high heat resistance, such that it is possible to suppress the deterioration of the polarization device, which is caused by oxidation or the like, even when the high-output light source is used. Therefore, it is possible to provide the projection type display apparatus that has a high reliability and a superior display characteristic.

According to yet another aspect of the invention, there is provided a liquid crystal device including a liquid crystal layer interposed between a pair of substrates; and the above-described polarization device, which is interposed between at least one substrate among the pair of substrates and the liquid crystal layer.

According to this configuration, it is possible to provide a liquid crystal device including the polarization device that has a superior optical characteristic and reliability.

According to still yet another aspect of the invention, there is provided an electronic apparatus including the above-described liquid crystal device.

According to this configuration, it is possible to provide an electronic apparatus that has a superior display quality and reliability.

BRIEF DESCRIPTION OF THE DRAWINGS

The invention will be described with reference to the accompanying drawing, wherein like numbers reference like elements.

DESCRIPTION OF EXEMPLARY EMBODIMENTS

First Embodiment

Figure 1A:
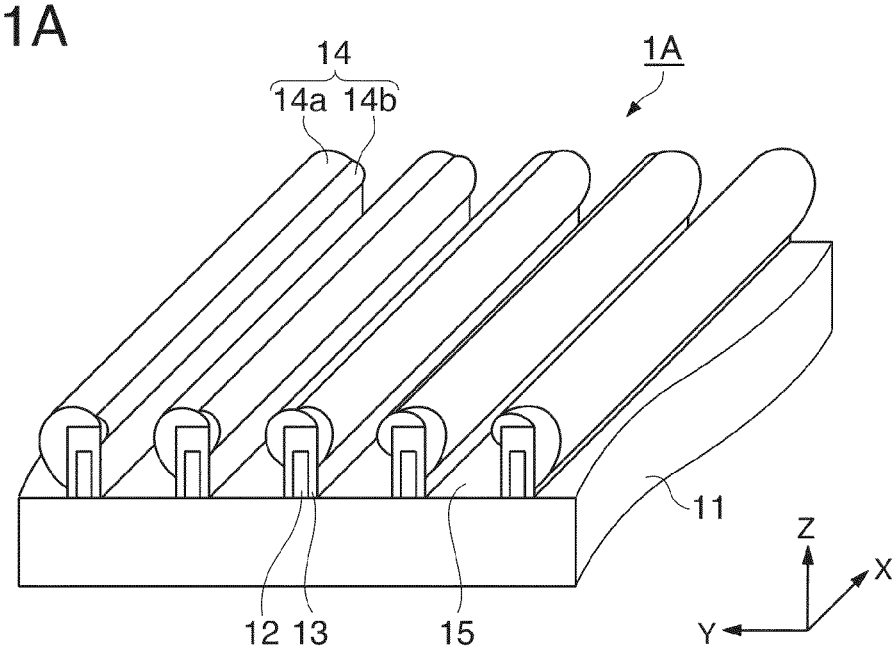
FIGS. 1A and 1B are schematic diagrams illustrating a polarization device according to a first embodiment of the invention.
Figure 1B:
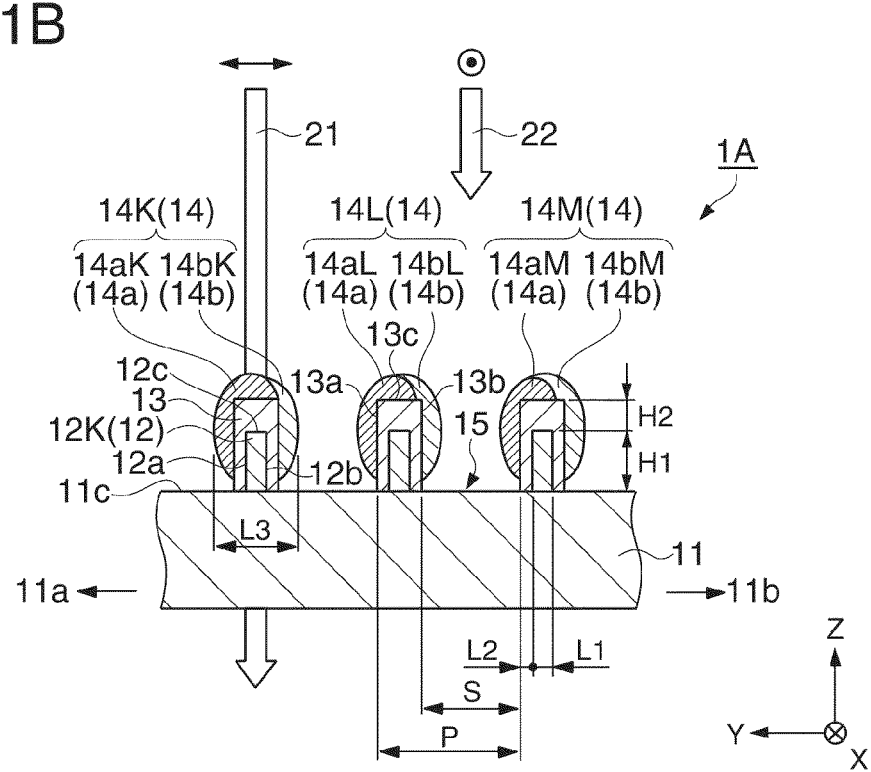

Hereinafter, a polarization device and a method of manufacturing the polarization device according to an embodiment of the invention will be described with reference to the drawings. FIGS. 1A and 1B are schematic diagrams of a polarization device 1A of this embodiment, in which FIG. 1A is a partial perspective view and FIG. 1B is a partial cross-sectional view, in which the polarization device 1A is cut out at the YZ plane.

In addition, in the following description, the orthogonal XYZ coordinate system is set and a positional relationship of each member will be described with reference to the XYZ coordinate system. At this time, a plane, which is parallel to a plane 11c of a substrate 11 provided with a metal layer 12, is set as the XY plane, and an extending direction of the metal layer 12 is set as the X-axis direction. An arrangement axis of the metal layer 12 is the Y-axis. In addition, in all of the following drawings, the scale and thickness of each component is appropriately made to be different for easy understanding of the drawings.

Polarization Device

As shown in FIGS. 1A and 1B, the polarization device 1A includes a substrate 11, a plurality of metal layers 12 formed on the substrate 11 in a stripe shape in a plan view, first dielectric layers 13, each covering one of the metal layers 12, and second dielectric layers 14, each being provided on each of the first dielectric layers 13. The first dielectric layer 13 covers a first side face 12a extending in an X-axis direction of the metal layer 12, a second side face 12b opposite to the first side face 12a, and a top part 12c.

As the substrate 11, a glass substrate is used. However, the substrate 11 may be formed of a translucent material. For example, quartz, plastic, or the like may be used for the substrate. In addition, since the polarization device 1A may accumulate heat and gain a high temperature depending on a usage of the polarization device 1A, as the material of the substrate 11, glass or quartz having high heat resistance is preferable.

As a material of the metal layer 12, a material having a high reflectance with respect to light in a visible range is used. In this embodiment, as the material of the metal layer 12, aluminum is used. A metallic material such as silver, copper, chrome, titanium, nickel, tungsten, and iron may be used other than aluminum.

The first dielectric layer 13 is formed on the first side face 12a, the second side face 12b, and the top part 12c of the metal layer 12. As a material of the first dielectric layer 13, a material having a high translucency in a visible range, for example, a dielectric material such as aluminum oxide is used. In this example, as the first dielectric layer 13, an oxide of the metal layer 12 is used. As described later, the first dielectric layer 13 may be formed by oxidizing the metal layer 12.

A groove portion 15 is provided between two adjacent metal layers 12. The groove portion 15 is provided with a substantially equal distance in the Y-axis direction at a cycle shorter than a wavelength of visible light. The metal layer 12 and the first dielectric layer 13 are arranged in the Y-axis direction with the same cycle as each other.

For example, a height H1 of the metal layer 12 is 50 to 200 nm, and a width L1 of the metal layer 12 in the Y-axis direction is 40 nm. A height H2 of the first dielectric layer 13 is 10 to 100 nm, and a width L2 of the first dielectric layer 13 in the Y-axis direction is 5 to 30 nm. The width L2 of the first dielectric layer 13 may be called a thickness of the first dielectric layer 13 at a side face of the metal layer 12.

In addition, a distance S between two adjacent first dielectric layers 13 (width of the groove portion 15 in the Y-axis direction) is 70 nm, and a cycle P (pitch) is 140 nm.

The second dielectric layer 14 is provided on the first dielectric layer 13 in regard to the first side face 12a, the second side face 12b, and the top part 12c of the metal layer 12. That is, the first dielectric layer 13 is provided between the second dielectric layer 14 and the metal layer 12. In addition, the second dielectric layer 14 extends in the X-axis direction similar to the metal layer 12. As a material of the second dielectric layer 14, a material having an optical absorption rate higher than that of the first dielectric layer 13 in a visible range is used.

In this embodiment, germanium is used. Other than germanium, for example, silicon, molybdenum, tellurium, or the like may be used. In addition, in the YZ cross-section shown in FIG. 1B, a width L3 of the second dielectric layer 14 in the Y-axis direction has a value that is larger than double the sum of the width L1 of the metal layer 12 and the width L2 of the first dielectric layer 13 and that is smaller than the cycle P (pitch) of the first dielectric layer 13 (or the metal layer 12).

The second dielectric layer 14 includes a first member 14a formed at the side of the first side face 12a of the metal layer 12, that is, on a first side face 13a of the first dielectric layer 13 and a second member 14b formed at the side of the second side face 12b of the metal layer 12, that is, on a second side face 13b of the first dielectric layer 13, and the first and second members 14a and 14b overlap each other at the top part 12c (upper end) of the metal layer 12.

Suppose that a second dielectric layer 14K which is provided to a metal layer 12K and a second dielectric layer 14M which is provided to a metal layer 12 other than the metal layer 12K are selected. If a cross-sectional area of a first member 14aK making up the second dielectric layer 14K in a YZ cross-section and a cross-sectional area of a first member 14aM making up the second dielectric layer 14M in the YZ cross-section are compared to each other, the cross-sectional area of the first member 14aK is different from the cross-sectional area of the first member 14aM. Similarly, a cross-sectional area of a second member 14bK making up the second dielectric layer 14K is different from a cross-sectional area of a second member 14bM making up the second dielectric layer 14M.

The above-described difference in the cross-sectional area corresponds to the difference in a volume per unit length. Here, a definition of the volume per unit length of the first member 14a will be described by using a metal layer 12K. In the first members 14aK provided corresponding to the metal layer 12K, a value obtained by dividing a volume of the first member 14aK in a region where the metal layer 12K and the first member 14aK are commonly provided in the X-axis direction by a length of the region in the X-axis direction is defined as the volume per unit length of the first member 14aK. A volume per unit length of the second member 14b and a volume per unit length of the second dielectric layer 14 are also defined in a similar way. Hereinafter, in this specification, the volume per unit length is referred to as a volume for simplicity.

Specifically, the volume of the first member 14a and the volume of the second member 14b depend on a distance from a first end 11a of the substrate 11 in the Y-axis direction. More specifically, the volume of the first member 14a becomes large as it approaches the first end 11a, and the volume of the second member 14b becomes large as it approaches a second end 11b opposite to the first end 11a. In addition, in the metal layer 12 that is closest to the first end 11a, the volume of the first member 14a making up the second dielectric layer 14 is larger than the volume of the second member 14b making up the second dielectric layer 14, and in the metal layer 12 that is the most distant from the first end 11a, the volume of the first member 14a making up the second dielectric layer 14 is smaller than the volume of the second member 14b making up the second dielectric layer 14.

However, the volume of the second dielectric layer 14 represented by the sum of the volume of the first member 14a and the volume of the second member 14b has approximately a constant value in any second dielectric layer 14.

That is, as shown in FIG. 1B, the volume of the first member 14aK is different from the volume of the second member 14bK, the volume of the first member 14aL is different from the volume of the second member 14bL, and the volume of the first member 14aM is different from the volume of the second member 14bM, but the volume of the second dielectric layer 14K, the volume of the second dielectric layer 14L, and the volume of the second dielectric layer 14M are approximately the same as each other.

A relationship between the volume of the first member 14a, the volume of the second member 14b, and the volume of the second dielectric layer 14 is also true of a relationship of a cross-sectional area of the first member 14a, a cross-sectional area of the second member 14b, and the cross-sectional area of the second dielectric layer 14 represented by the sum of the cross-sectional area of the first member 14a and the cross-sectional area of the second member 14b, in the YZ cross-section.

In addition, in regard to FIG. 1A, the dependency on the distance from the first end 11a in the volume of the first member 14a and the volume of the second member 14b, is drawn exaggeratedly.

As described above, the polarization device 1A including the metal layer 12, the first dielectric layer 13, and the second dielectric layer 14 is configured to transmit a transverse magnetic (TM) wave 21 that is linearly polarized light vibrating in a direction (Y-axis direction) orthogonal to the extension direction of the metal layer 12 and to absorb a transverse electric (TE) wave 22 that is linearly polarized light vibrating in the extension direction (X-axis direction) of the metal layer 12.

Method of Manufacturing Polarization Device

Hereinafter, a method of manufacturing the polarization device 1A of this embodiment will be described. FIGS. 2A to 2D show process diagrams illustrating a method of manufacturing the polarization device in the first embodiment.

The method of manufacturing the polarization device 1A according to this embodiment includes a metal layer forming process of forming the plurality of metal layers 12 with a stripe shape in a plan view on the substrate 11, a first dielectric layer forming process of forming the first dielectric layer 13 on the first side face 12a, the second side face 12b, and the top part 12c of the metal layer 12, and a second dielectric layer forming process of forming the second dielectric layer 14 (the first and second members 14a and 14b) on the first side face 13a, the second side face 13b, and the top part 13c (upper end) of the first dielectric layer 13, that is, a side of the first dielectric layer 13, which is opposite to the metal layer 12.

Furthermore, the process of forming the second dielectric layer includes a first member forming process of obliquely forming a film from a direction from one of two first dielectric layers 13 adjacent to each other to form a first member 14a on the top part and a side face of the first dielectric layer 13, and a second member forming process of obliquely forming a film from a direction from the other of the first dielectric layers 13 to form the second member 14b as an upper layer of the first dielectric layer 13. Hereinafter, description will be given with reference to the drawings.

Figure 2A:
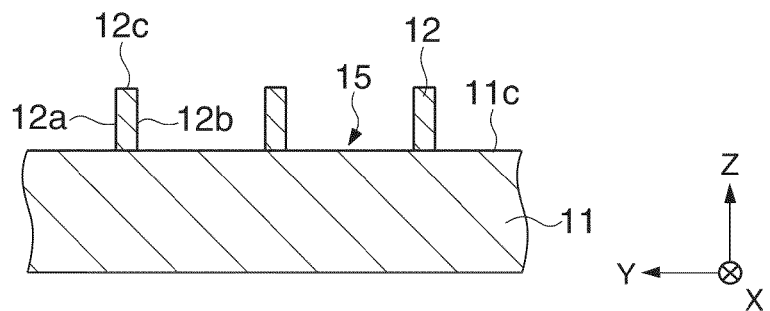
FIGS. 2A to 2D are process cross-sectional views illustrating a method of manufacturing the polarization device according to the first embodiment.

In the process of forming the metal layer of FIG. 2A, the metal layer 12 is formed on a plane 11c of the substrate 11. Specifically, an aluminum film is formed on the substrate and a resist film is formed on the aluminum film. Subsequently, the resist film is exposed and then is developed, and thereby a stripe-shaped pattern is formed in the resist film. Subsequently, the aluminum film is etched until the plane 11c of the substrate 11 comes to appear by using the resist film as an etching mask. Subsequently, the resist film is removed, and thereby a plurality of metal layers 12 disposed in a stripe shape is formed on the substrate 11.

Figure 2B:
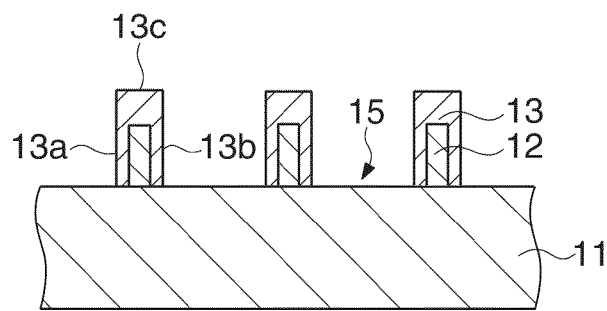

In the first dielectric layer forming process of FIG. 2B, the first dielectric layer 13 is formed on the first side face 12a, the second side face 12b, and the top part 12c of each of the metal layers 12. Specifically, the substrate 11 on which the metal layers 12 are formed is disposed in a vacuum vessel that is formed of quartz or the like and ozone gas is controlled within a range of 50 Pa to 100 Pa therein.

Subsequently, the metal layers 12 are irradiated by ultraviolet light (wavelength<310 nm) from the plane 11c side of the substrate 11. The ultraviolet light is emitted by a Deep-UV lamp. For example, an intensity of the ultraviolet light is 120 mW/cm². The ozone gas has a high absorption coefficient within a wavelength of 220 nm to 300 nm, such that as a result of optical absorption reaction, oxygen atoms in an excited state, which has high energy, may be generated efficiently.

The excited oxygen atoms have a diffusion coefficient (activity) greater than that of normal oxygen atoms have, and show a high oxidation rate. In addition, an oxidized film may be formed at a low temperature lower than that in thermal oxidation. In this process, a side, which is opposite to the plane 11c of the substrate 11, is irradiated by a halogen lamp and thereby a temperature of the substrate is increased to 150° C. Accordingly, the oxidation reaction is further promoted. Under this environment, ozone oxidation is performed for 20 minutes, and thereby an aluminum oxidized film (first dielectric layer 13) with a thickness L2 of 30 nm is formed on a surface of the metal layer 12. The thickness of the first dielectric layer may be appropriately selected depending on a magnitude of a phase difference applied to visible light.

According to the manufacturing method of this embodiment, it is possible to form the oxidized film (first dielectric layer 13) of the metal layer 12 at a temperature lower than that in the related art. Therefore, it is possible to decrease cracking or deformation of the substrate, and it is possible to decrease variation before and after the heat treatment in the dimensions of the metal layer 12 such as the height and the width that determine the characteristics of the polarization device. Therefore, it is possible to increase an in-plane uniformity of the polarization characteristics of the polarization device 1A.

In addition, according to the manufacturing method of this embodiment, it is possible to cover the first side face 12a, the second side face 12b, and the top part 12c of the metal layer 12 with the first dielectric layer 13 a density higher than that in the related art. Therefore, even when the temperature is raised in use, it is possible to prevent the deterioration of the metal layer 12, which may be caused by oxidation or the like, and thereby it is possible to lower a decrease in the polarization characteristic.

Figure 2C:
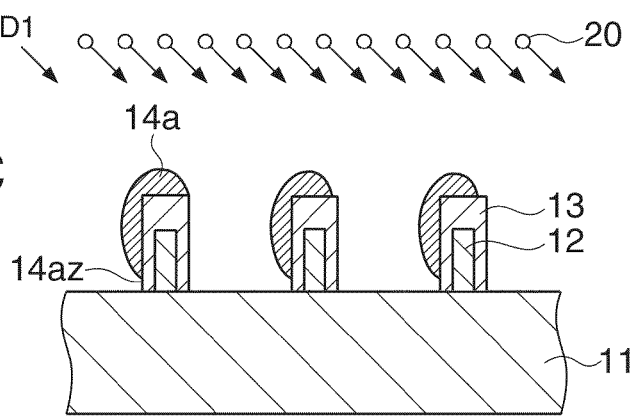

In the first member forming process of FIG. 2C, germanium is obliquely deposited to form the first member 14a on the first side face 13a and the top part 13c (upper end) of the first dielectric layer 13. Specifically, a sputtered particle 20 is deposited on the first side face 13a and the top part 13c (upper end) of the first dielectric layer 13 in a first direction D1 that is oblique with respect to a surface normal line (Z-axis direction) of the plane 11c of the surface 11 on which the metal layer 12 and the first dielectric layer 13 are formed and that is opposite to the first side face 12a of the metal layer 12, for example, by using a sputtering apparatus, to form the first member 14a. In addition, in FIGS. 2C and 2D, a main incident direction of the sputtered particle 20 is indicated by an arrow. An angle between the surface normal line of the plane 11c of the substrate 11 and the incident direction of the sputtered particle 20 may be appropriately set within a range of 40° to 85°.

Figure 2D:
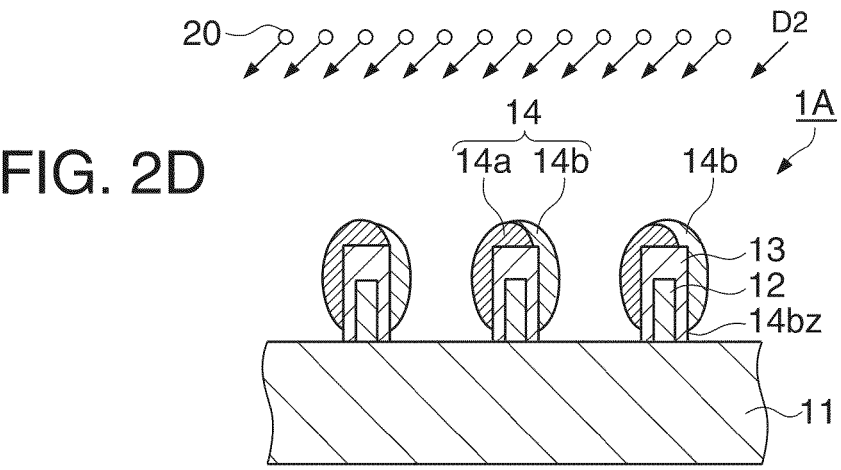

In the second member forming process of FIG. 2D, germanium is obliquely deposited to form the second member 14b as an upper layer of the first dielectric layer 13. Specifically, a sputtered particle 20 is deposited on the second side face 13b and the first member 14a of the first dielectric layer 13 from a second direction D2 that is oblique with respect to the surface normal line of the plane 11c of the substrate 11 and that is opposite to the second side face 12b of the metal layer 12, for example, by using a sputtering apparatus, to form the second member 14b as an upper layer of the first dielectric layer 13. An angle between the surface normal line of the plane 11c of the substrate 11 and the incident direction of the sputtered particle 20 may be appropriately set within a range of 40° to 85°.

As described above, the first and second members 14a and 14b are formed, whereby it is possible to form the second dielectric layer 14. Through the above-described processes, the polarization device 1A can be manufactured. In addition, in this embodiment, as the material of the first and second members, germanium is used, but the material of the first member may be different from that of the second member. In this case, it is preferable that the difference in the optical absorption rate between the material of the first member and the second member is small.

Here, in the first member forming process, due to a so-called shadowing effect where a part of the metal layer 12 and a part of the first dielectric layer 13 are shadowed at the time of obliquely forming a film, the first member is hardly formed at the groove portion 15 formed between two adjacent metal layers 12. Similarly, in the second member forming process, due to the shadowing effect at the time of obliquely forming a film, the second member is hardly formed at the groove portion 15.

As a method of forming the second dielectric layer on the first dielectric layer, a method in which the material of the second dielectric layer is deposited on the first dielectric layer from a direction (Z-axis direction) that is parallel with the surface normal line of the substrate 11 may be considered. In this case, the material of the second dielectric layer is also deposited at a region (groove portion 15) between the two adjacent metal layers 12 on the substrate 11.

However, when the second dielectric layer is formed at the groove portion 15, the characteristics of the polarization device 1A as a polarization plate is deteriorated, such that it is necessary to remove the second dielectric layer formed at the groove portion 15. On the other hand, according to the manufacturing method of this embodiment, it is possible to prevent the second dielectric layer from being formed at the groove portion 15, such that a process of removing the second dielectric layer formed at the groove portion 15 is not necessary.

The first member 14a is provided on the first side face 13a of the first dielectric layer 13, but a substrate 11 side end portion 14az of the first member 14a is located between the plane 11c of the substrate 11 and the top part 13c (upper end) of the first dielectric layer 13. That is, the end portion 14az of the first member 14a is terminated on the face of the first side face 13a.

Similarly, the second member 14b is provided on the second side face 13b of the first dielectric layer 13, but a substrate 11 side end portion 14bz of the second member 14b is located between the plane 11c of the substrate 11 and the top part 13c (upper end) of the first dielectric layer 13. That is, the end portion 14bz of the second member 14b is terminated on the face of the second side face 13b.

As described above, neither the first member 14a nor the second member 14b are provided at the groove portion 15. As shown in FIG. 1B, a cross-section of the second dielectric layer 14 in a YZ cross-section has a shape where a portion having the greatest width L3 in the second dielectric layer 14 is located at the top part side of the second dielectric layer 14 rather than the substrate 11 side end portion 14az of the first member 14a and the substrate 11 side end portion 14bz of the second member 14b.

In addition, at the time of obliquely forming a film in the above-described first member forming process and the second member forming process, there is a tendency that an amount of the sputtered particles to be deposited between a region close to a target of the sputtering apparatus and a region far away from the target is different in the plane 11c of the substrate 11. Specifically, as it is close to the target, the amount of the sputtered particles to be deposited becomes large.

Therefore, in the first member forming process of FIG. 2C, a volume of the first member 14a becomes large as it approaches the target of the sputtering apparatus (a positive direction side of the Y-axis) and becomes small as it moves away from the target (a negative direction side of the Y-axis). On the other hand, in the second member forming process of FIG. 2D, a volume of the second member 14b becomes large as it approaches the target of the sputtering apparatus (the negative direction side of the Y-axis) and becomes small as it moves away from the target (the positive direction side of the Y-axis).

Therefore, as described above with reference to FIG. 1B, the volume of the first member 14aK is different from that of the second member 14bK, the volume of the first member 14aL is different from that of the second member 14bL, and the volume of the first member 14aM is different from that of the second member 14bM, but the volumes of the second dielectric layer 14K, the second dielectric layer 14L, and the second dielectric layer 14M are approximately equal each other. That is, the second dielectric layer 14 having approximately the same volume is formed on the metal layers 12, respectively.

Hereinafter, an operation of the polarization device 1A of this embodiment will be described.

As described above, in regard to the polarization device 1A, the metal layer 12 is formed of a material such as aluminum that has a high optical reflectance within a visible region. In addition, the first dielectric layer 13 is formed of a material such as aluminum oxide that has a high optical transmittance in a visible region. Furthermore, the second dielectric layer 14 (the first and second members 14a and 14b) is formed of a material such as germanium that has an optical absorption rate higher than that of the first dielectric layer 13 in a visible region.

As described above, the polarization device 1A has a structure where the metal layer 12 and the first and second dielectric layers 13 and 14 are laminated, such that it is possible to transmit the TM wave 21 that is linearly polarized light vibrating in a direction orthogonal to the extension direction of the metal layer and to absorb the TE wave 22 that is linearly polarized light vibrating in the extension direction of the metal layer.

That is to say, the TE wave 22 incident from the second dielectric layer 14 side of the substrate 11 is attenuated by an optical absorption effect of the second dielectric layer 14, and when apart of the TE wave 22 passes through the second dielectric layer 14 and the first dielectric layer 13 without being absorbed, a phase difference is applied thereto. The TE wave 22 passed through the first dielectric layer 13 is reflected from the metal layer 12 (functions as a wire grid). When the reflected TE wave 22 passes through the first dielectric layer 13, a phase difference is applied thereto, and the reflected TE wave 22 is attenuated by an interference effect and a remainder thereof is absorbed again by the second dielectric layer 14.

Therefore, due to the above-described attenuation effect of the TE wave 22, it is possible to obtain a desired absorption type polarization characteristic.

In a case where the material of the second dielectric layer 14 is deposited on the first dielectric layer 13 from a direction oblique with respect to the Z-axis direction for preventing the second dielectric layer 14 from being formed in the groove portion 15, an amount of deposition of the material of the second dielectric layer 14 becomes different depending on the distance from a target. Therefore, the attenuation effect of the TE wave 22 may become non-uniform in a plane of the substrate 11, but according to the manufacturing method of this embodiment, it is possible to form the first and second members 14a and 14b formed of the same material on the metal layers 12, respectively, in a manner that the volume of the second dielectric layer 14 provided to each of the metal layer 12 is approximately the same with each other, such that it is possible to increase in-plane uniformity of the substrate 11 in the attenuation effect of the TE wave 22. As a result thereof, it is possible to increase in-plane uniformity of the polarization characteristic in the absorption type polarization device.

In addition, the entirety of both side faces and top face of the metal layer 12 is covered by the first dielectric layer 13 with a density higher than that in the related art, such that the deterioration of the metal layer, which may be caused by oxidation or the like, is prevented, and thereby it is possible to prevent the decrease in a polarization separation function. Since an area of remaining side face of the metal layer 12 is extremely small compared to the total surface area of the metal layer 12, the remaining side face of the metal layer 12 is not necessary to be covered by the first dielectric layer 13, but it may be covered.

As described above, according to this embodiment, it is possible to obtain the polarization device 1A in which the in-plane uniformity of the polarization characteristic is high, and the polarization characteristic is not easily decreased even when a temperature is raised in use.

Modified Example of First Embodiment

Figure 3:
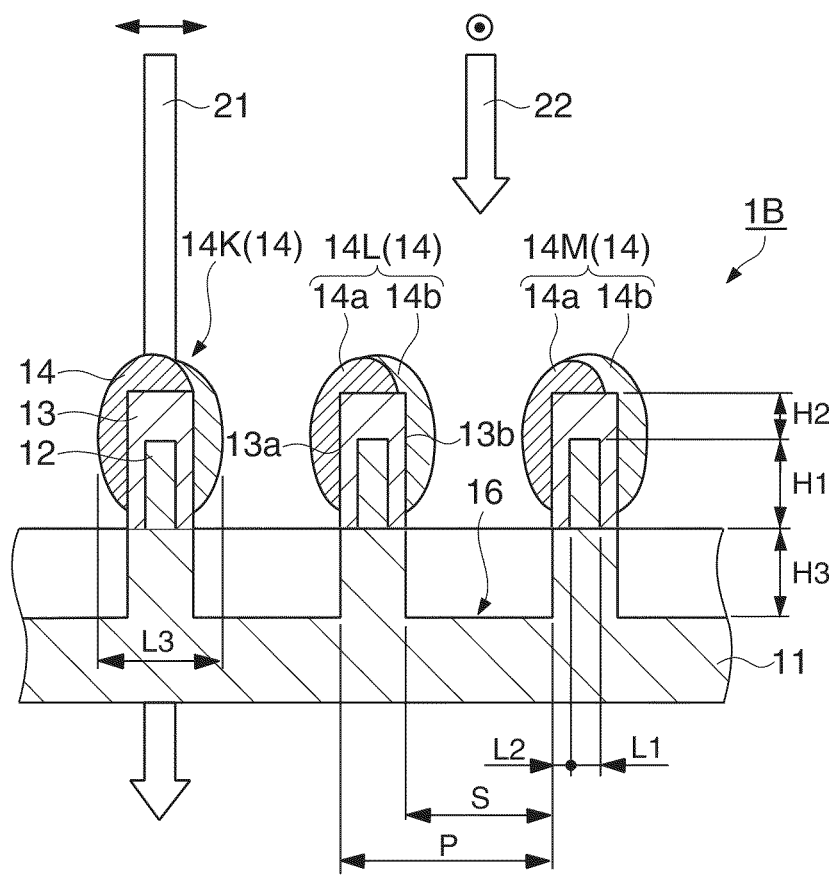
FIG. 3 is a schematic view illustrating a polarization device according to a modified example of the first embodiment.

FIG. 3 shows an explanatory diagram of a polarization device 1B according to a modified example of the first embodiment. The polarization device 1B is partially common to the polarization device 1A of the first embodiment. There is a difference in that a region 16, which has a refraction index lower than that of the substrate 11, is formed between the metal layers 12.

As shown in FIG. 3, the polarization device 1B has a region 16 having a refraction index lower than that of the substrate 11 between two adjacent metal layers 12, in addition to the configuration of the polarization device 1A.

The region 16 is formed by removing the substrate 11 exposed between the two adjacent metal layers 12 through dry etching or the like. A digging depth H3 is substantially the same as a height H1 of the metal layer 12.

According to this configuration, it is possible to reduce an effective refraction index of a boundary region between the substrate and the metal layer, such that the reflection of the TM wave 21 at the boundary region is suppressed and as a result, it is possible to increase the transmittance of the TM wave 21.

Projection Type Display Apparatus

Figure 4:
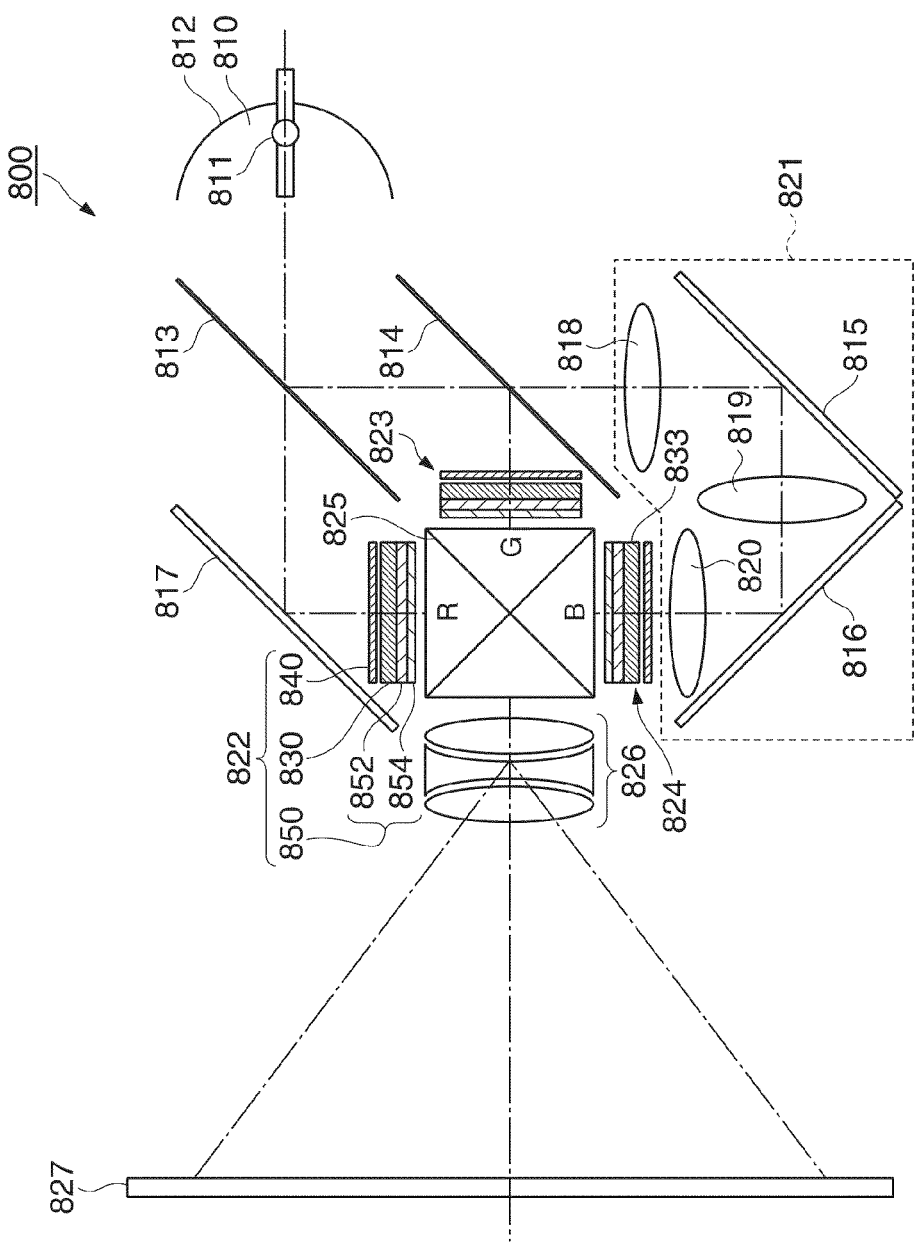
FIG. 4 is a schematic diagram illustrating a configuration of a projector as an electronic apparatus.

Hereinafter, embodiments of an electronic apparatus according to the invention will be described. A projector 800, which is shown in FIG. 4, includes a light source 810, dichroic mirrors 813 and 814, reflective mirrors 815, 816, and 817, an incident lens 818, a relay lens 819, an emission lens 820, light modulating units 822, 823, and 824, a cross dichroic prism 825, and a projective lens 826.

The light source 810 includes a lamp 811 such as a metal halide, and a reflector 812 that reflects light of the lamp. In addition, as the light source 810, an ultrahigh pressure mercury lamp, a flash mercury lamp, a high pressure mercury lamp, a Deep UV lamp, a xenon lamp, a xenon flash lamp or the like may be used other than the metal halide.

The dichroic mirror 813 transmits red light included in white light emitted from the light source 810 and reflects blue light and green light. The transmitted red light is reflected from the reflective mirror 817 and is incident to the light modulating unit 822 for red light. In addition, among the blue light and the green light reflected from the dichroic mirror 813, the green light is reflected from the dichroic mirror 814 and is incident to the light modulating unit 823 for green light. The blue light passes through the dichroic mirror 814 and is incident to the light modulating unit 824 via a relay optical system 821 including the incident lens 818 that is provided to prevent light loss caused by a long optical path, the relay lens 819, and the emission lens 820.

In the light modulating units 822 to 824, an incident side polarization device 840 and an emission side polarization device section 850 are disposed with a liquid crystal light valve 830 interposed therebetween. The incident side polarization device 840 is provided on a light path of light emitted from the light source 810 and between the light source 810 and the liquid crystal light valve 830. In addition, the emission side polarization device section 850 is provided on a light path of light passed through the liquid crystal light valve 830 and between the liquid crystal light valve 830 and the projection lens 826. The incident side polarization device 840 and the emission side polarization device section 850 are disposed in a manner that transmission axes thereof are orthogonal to each other (cross-Nicole arrangement).

The incident side polarization device 840 is a reflection type polarization device described in the first embodiment and reflects light in a vibration direction orthogonal to the transmission axis.

On the other hand, the emission side polarization device section 850 includes a first polarization device (pre-polarization plate, synonymous with a pre-polarizer) 852, and a second polarization device 854. As the first polarization device 852, the above-described polarization device of the second embodiment of the invention, which is provided with a protective film and has a high heat resistance, is used. In addition, the second polarization device 854 is a polarization device formed of an organic material as a formation material. The first and second polarization devices 852 and 854 are absorption type polarization devices, respectively, and the first and second polarization devices 852 and 854 absorb light in cooperation with each other. In addition, as the first polarization device 852, the polarization device according to the first embodiment of the invention may be used. In addition, as the incident side polarization device 840, the polarization device according to the invention may be used.

In general, an absorption type polarization device, which is formed of an organic material, is apt to be deteriorated due to heat, such that it is difficult to be used as a polarization device of a large output projector in which high brightness is necessary. However, in the projector 800 according to the invention, the first polarization device 852, which is formed of an inorganic material having high heat resistance, is disposed between the second polarization device 854 and the liquid crystal light valve 830, and the first and second polarization devices 852 and 854 absorb light in cooperation with each other. Therefore, it is possible to suppress the deterioration of the second polarization device 854 formed of an organic material.

Three colored light beams modulated by respective light modulating units 822 to 824 are incident to a cross dichroic prism 825. The cross dichroic prism 825 includes four right angle prisms bonded to each other, and at a boundary face thereof, a dielectric multi-layered film reflecting red light and a dielectric multi-layered film reflecting blue light are formed in an X-shape. The three colored light beams are synthesized by these dielectric multi-layered films and light representing a color image is formed. The synthesized light is projected on a screen 827 by a projection lens 826 that is a projective optical system and the image is enlarged and displayed.

The projector 800 with the above-described configuration uses the polarization device according to the invention is utilized as the emission side polarization device section 850, whereby it is possible to suppress the deterioration of the polarization device even when the high-output light source is used. Therefore, it is possible to provide the projector 800 that has a high reliability and a superior display characteristic.

Liquid Crystal Device

Figure 5:
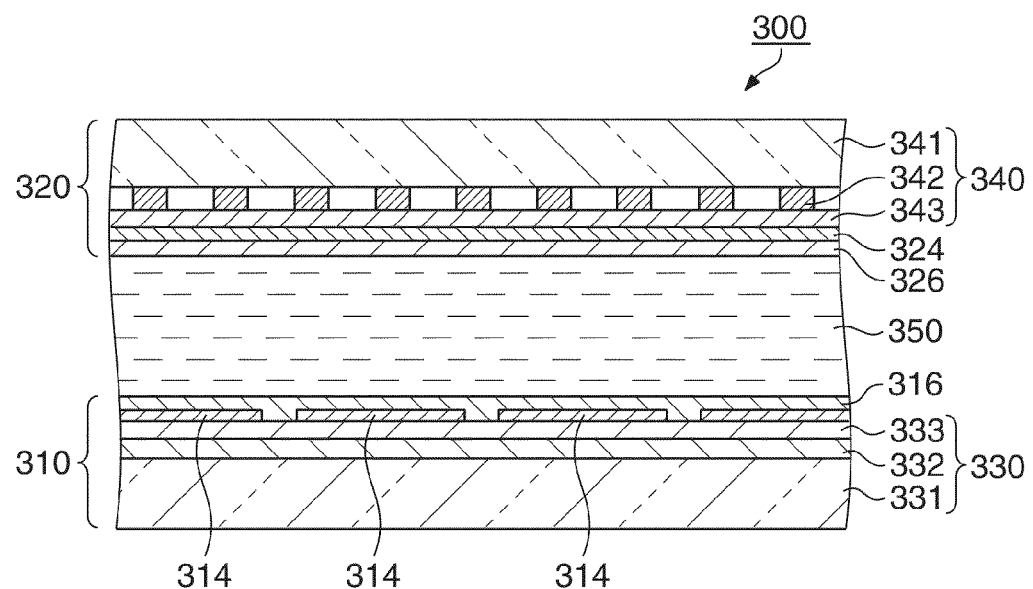
FIG. 5 is a schematic diagram illustrating a configuration of a liquid crystal device.

FIG. 5 shows a cross-sectional schematic diagram illustrating an example of a liquid crystal device 300 including the polarization device according to the invention. The liquid crystal device 300 of this embodiment has a configuration where a liquid crystal layer 350 is interposed between an element substrate 310 and a counter substrate 320.

The element substrate 310 includes a polarization device 330, and the counter substrate 320 includes a polarization device 340. The polarization device 330 and the polarization device 340 are the above-described polarization devices of the first embodiment.

The polarization device 330 includes a substrate main body 331, a metal layer 332, and a protective film 333, and the polarization device 340 includes a substrate main body 341, a metal layer 342, and a protective film 343. However, the first and second dielectric layers 13 and 14, which include the metal layers 332 and 342, respectively, are not shown in FIG. 5. In this embodiment, the substrate main bodies 331 and 341 are substrates of the polarization device and also serve as substrates for the liquid crystal device. In addition, the metal layers 332 and 342 are disposed to intersect each other. In any of the polarization devices, the metal layer is disposed at an inner face side (liquid crystal layer 350 side).

At the liquid crystal layer 350 side of the polarization device 330, a pixel electrode 314, an interconnection and a TFT device (not shown), and an alignment film 316 are provided. Similarly, at an inner face side of the polarization device 340, a common electrode 324 and an alignment film 326 are provided.

In the liquid crystal device configured as described above, the substrate main bodies 331 and 341 combine the functions of the substrate for the liquid crystal device and the substrate for the polarization device, whereby it is possible to reduce the number of parts. Therefore, the entirety of the apparatus can be made to be slim, and thereby the function of the liquid crystal device 300 can be improved. Furthermore, the apparatus structure is simple, such that the manufacturing thereof is easy and thereby a reduction in cost may be realized.

Electronic Apparatus

Figure 6:
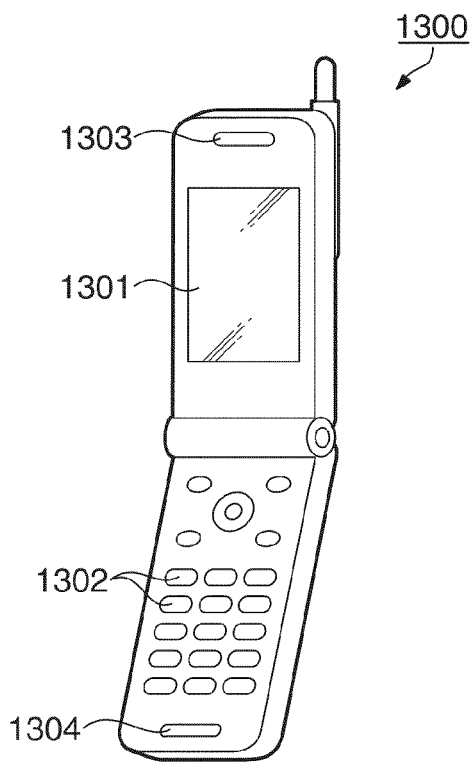
FIG. 6 is a perspective view illustrating a configuration of a mobile phone as an electronic apparatus in which the liquid crystal device is mounted.

Hereinafter, another embodiment related to an electronic apparatus according to the invention will be described. FIG. 6 shows a perspective view illustrating an example of the electronic apparatus using the liquid crystal device shown in FIG. 5. A mobile phone (electronic apparatus) 1300 shown in FIG. 6 includes the liquid crystal device as a small-sized display section 1301, a plurality of operation buttons 1302, an earpiece 1303, and a mouthpiece 1304. Therefore, it is possible to provide the mobile phone 1300 including a display section that has superior reliability and can display in high quality.

In addition, the liquid crystal device may be suitably used as an image display section of an electronic book, a personal computer, a digital still camera, a liquid crystal television, a projector, a view finder type or monitor direct vision type video tape recorder, a car navigation apparatus, a pager, an electronic pocket book, a calculator, a word processor, a work station, a television phone, a POS terminal, an apparatus having a touch panel, or the like, other than the mobile phone.

The invention is not limited to the above-described embodiment and various changes may be made without departing from the scope of the invention.

Test Production Verification of Polarization Device and Evaluation of Reliability For confirming the effect of the invention, first, a polarization device not including the second dielectric layer was manufactured and characteristics thereof were evaluated.

In the evaluation, it was assumed that the polarization device according to the invention was applied as a polarization device for a light valve of a liquid crystal projector. The polarization device according to the invention is formed of an inorganic material and has a high heat resistance, and thereby can be applied as an incident side polarization device of a liquid crystal projector having the high output light source described above.

In the incident side polarization device as described above, it is necessary to have high transmittance with respect to TM light, and to have a high reflectance and a low transmittance with respect to TE light. Specifically, when the transmittance I(TM) of TM light is greater than 80%, and the transmittance I(TE) of the TE light is less than 1%, there is no problem in use, and it is more preferable that the contrast defined by I(TM)/I(TE) is 100 or more. In addition, a time where the transmittance of the TE light is changed by 10% from an initial value is defined as a product lifespan.

Figure 7:
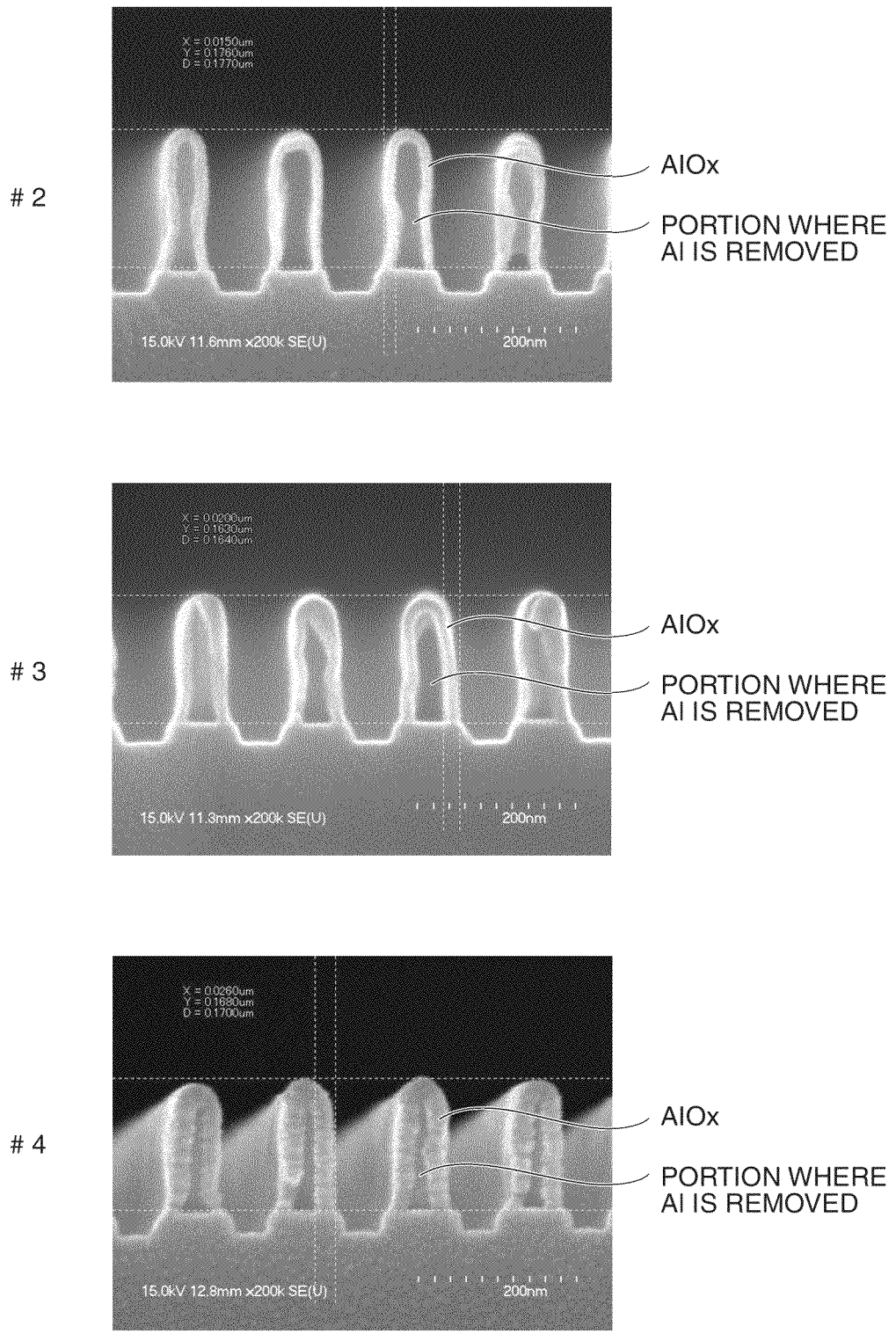
FIG. 7 is an SEM photograph illustrating a YZ cross-section of a reflection type polarization device.

Test production levels are shown in Table 1. A width L2 of the first dielectric layer 13 is controlled by a processing time of the above-described ozone oxidation. In each sample, the following are common. The height H1 of aluminum (metal layer 12): 160 nm, the width S of the groove portion 15: 70 nm, and the cycle P of the first dielectric layer 13 (or metal layer 12): 140 nm. Sample No. 1 is a comparative example where the ozone processing is not performed, and a naturally oxidized film is formed on a surface of the metal layer 12. The naturally oxidized film is different from the first dielectric layer 13 according to the invention, but in Table 1, a thickness of the naturally oxidized film of Sample No. 1 is shown as a width L2 of a first dielectric layer for convenience. FIG. 7 shows SEM observation results of Nos. 2, 3, and 4. In the observation, in order to measure a width of the dielectric layer, the aluminum was dissolved to expose the first dielectric layer 13.

TABLE 1

| Sample No. | Width L1 of metal layer (mm) | Width L2 of first dielectric layer (mm) |
|---|---|---|
| 1 | 60 | 5 |
| 2 | 40 | 15 |
| 3 | 30 | 20 |
| 4 | 18 | 26 |

With respect to the sample manufactured as described, a reliability test was performed at 300° C. under the atmosphere environment. Next, a lifespan where transmittance of the TE light was changed by 10% from an initial value and a magnification of extended lifespan with No. 1 given as a reference were shown in Table 2. In the measurement, a spectral photometer U-4100 (trade name; manufactured by Hitachi High-Technologies Corporation) was used.

TABLE 2

| Sample No. | Lifespan (hr) | Magnification of extended lifespan |
|---|---|---|
| 1 | 3.2 | 1.0 |
| 2 | 110.0 | 34.3 |
| 3 | 230.0 | 71.7 |
| 4 | 123.3 | 38.5 |

From the results, the lifespan is significantly increased by the formation of the dielectric layer, and No. 3 (width of the dielectric layer is 20 nm) shows the highest value in the magnification of the extended lifespan. Here, the formed first dielectric layer 13 (aluminum oxide) has a lattice constant greater than that of the metal layer 12 (aluminum) by substantially 20%. Therefore, like the case of No. 4, it is considered that when the metal layer is converted into the first dielectric layer 13 by 40% or more with respect to the width (60 nm) of the metal layer 12 before the ozone processing, crystal defects occur according to the change in volume, and as a result thereof, oxygen is introduced by using the crystal defects as an introduction path and thereby the oxidation is progressed. From the above description, it could be seen that in the case of the test-produced polarization device, when the width L2 of the first dielectric layer 13 was controlled in a range of 25% to 40% inclusive with respect to the width of the metal layer 12 before the ozone processing, it was possible to manufacture the polarization device having the longest product lifespan.

From the results, it was confirmed that the reflection type polarization device having the configuration of the invention had superior optical characteristics and the configuration of the invention was effective for solving the problems.

Optical Characteristic Evaluation by Simulation Analysis

Next, a simulation analysis result of the absorption type polarization device including the second dielectric layer 14 according to the first embodiment will be described.

In the analysis, an evaluation was performed under an assumption that the polarization device according to the invention was applied to a polarization device for a light valve of a liquid crystal projector. The polarization device according to the invention is formed of an inorganic material and the heat resistance is high, such that it is possible to apply the polarization device as a pre-polarization plate of the liquid crystal projector including a high output light source.

In the above-described pre-polarization plate, it is important to have high optical transmittance with respect to TM light and to transmit the TM light well. On the other hand, as described above, two sheets of polarization devices absorb the TE light in cooperation with each other, such that the absorption rate of the TE light is not necessary to be so high. Specifically, when the transmittance of the TM light is greater than 80%, and the absorption rate of the TE light is greater than 40%, there is no problem in use. In regard to the absorption rate of the TE light, it is more preferable to be greater than 50% so as to reduce the burden to two sheets of polarization devices. In addition, to prevent the TE light from being reflected from the pre-polarization plate and returning to the light valve, it is preferable that the reflectance of the TE light is small, and more preferably, 20% or less.

Here, in the analysis described below, the evaluation was performed with a reference that the transmittance of the TM light was greater than 80%, the reflectance of the TE light was less than 20%, and the absorption rate of the TE light was greater than 40%.

In the simulation analysis, the shape of the polarization device and a refraction index of a constituent material or the like were set as parameters by using GSolver that is an analysis software manufactured by Grating Solver Development Company.

A numerical calculation was performed by using a model where the metal layer 12 (aluminum), the first dielectric layer 13 (aluminum oxide), and the second dielectric layer 14 (germanium) were formed in this order from the substrate. In the first embodiment (FIGS. 1A and 1B), the entire surface of the metal layer 12 was covered by the first dielectric layer 13, and the top part 13c of the first dielectric layer 13 was covered by the second dielectric layer 14.

In the calculation, the setting was as follows. The height H1 of the aluminum (metal layer 12): 80 nm, the width L1: 20 nm, the height of H2 of the aluminum oxide (first dielectric layer 13): 20 nm, the width L2: 20 nm, the height of germanium (second dielectric layer 14): 0 to 30 nm, the width L3: 60 nm, the width S of the groove portion 15 in the Y-axis direction: 80 nm, and the cycle P of the first dielectric layer 13 (or the metal layer 12) was 140 nm. In addition, as the refraction index and an extinction coefficient of the constituent material of the above-described polarization device, each parameter stored in the GSolver was used.

Figure 8A:
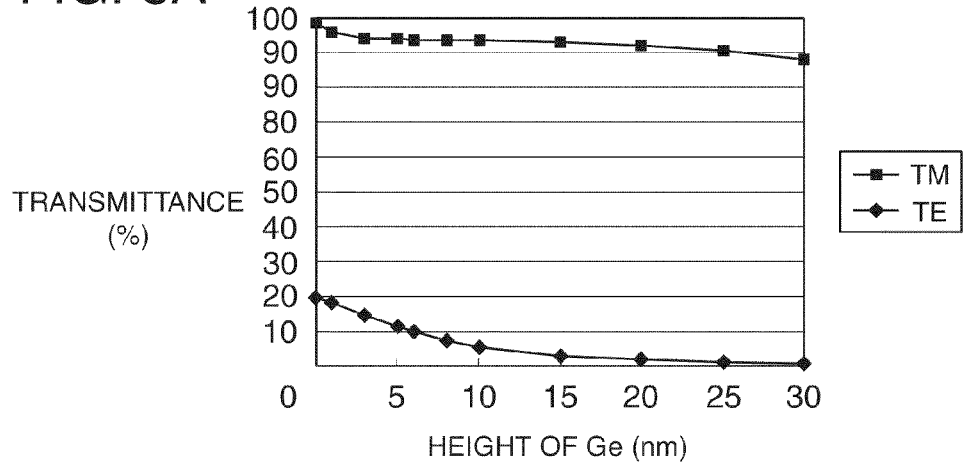
FIGS. 8A to 8C are diagrams illustrating optical characteristics of the first embodiment through a simulation analysis.
Figure 8B:
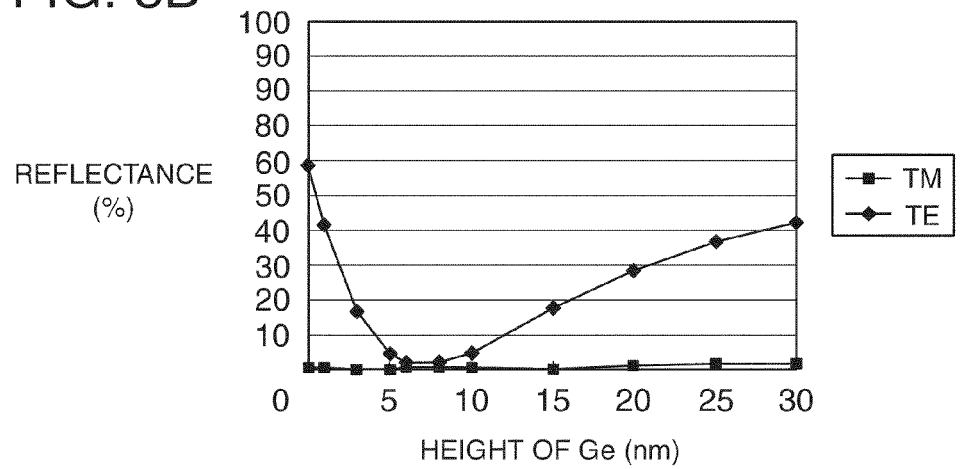
Figure 8C:
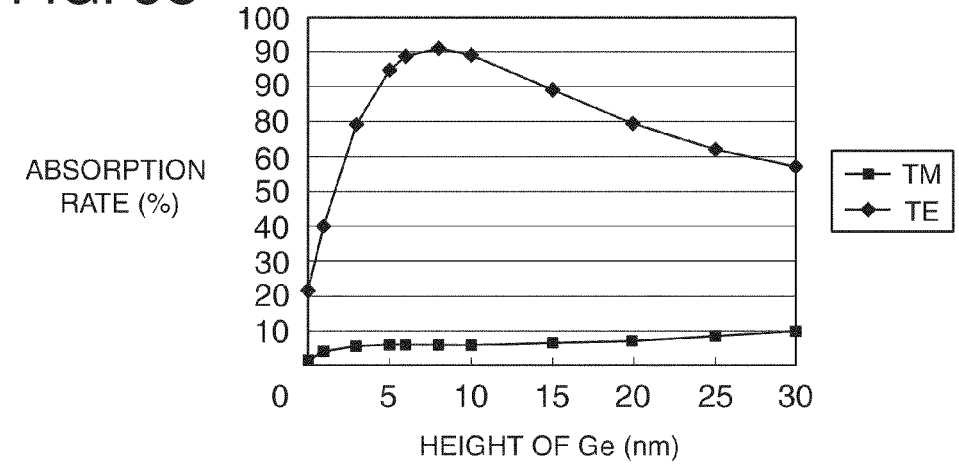

In the above-described model, a change in characteristics in a case of changing the thickness of the germanium was obtained. FIGS. 8A to 8C show a graph illustrating a simulation result in each characteristic of the transmission, the reflection, and the absorption with respect to the TM light and the TE light. FIGS. 8A to 8C show the transmission characteristic, the reflection characteristic, and the absorption characteristic, respectively, in which the thickness of the germanium is shown in a horizontal axis and the value (unit: %) in each optical characteristic at a wavelength of 532 nm (green color) is shown in a vertical axis. Here, the height of the germanium was changed from 0 to 30 nm.

From the analysis result, it could be seen that as the height of the germanium increased, the transmittance and reflectance of the TE light decreased and the absorption rate of the TE light increased, and it was obvious that the optical characteristic of the TE light was seriously affected by the height of the germanium. In a case of being used as the above-described absorption type polarization device, it is preferable that a region where the absorption rate of the TE light is 40% or more and the reflectance is 20% or less is selected, and specifically, the height of the germanium is set to a value between 3 nm and 15 nm. In addition, since the absorption rate of the TE light is reduced when the height of the germanium becomes 10 nm or more, it is preferable that the height of the germanium is set to a value between 3 nm and 8 nm.

From these results, it was confirmed that the absorption type polarization device having the configuration of the invention had superior optical characteristics and the configuration of the invention was effective for solving the problems.

The entire disclosure of Japanese Patent Application No. 2010-136851, filed on Jun. 16, 2010 is expressly incorporated by reference herein.

What is claimed is:

1. A polarization device comprising:
a substrate; and
a plurality of metal layers that is provided on one face of the substrate in a stripe shape and includes a first dielectric layer and a second dielectric layer,
wherein an optical absorption rate of the second dielectric layer is higher than that of the first dielectric layer,
in two side faces opposite to each other of a plurality of side faces of a first metal layer and in a top part of the first metal layer among the plurality of metal layers, the first dielectric layer included in the first metal layer is provided between the second dielectric layer included in the first metal layer and the first metal layer, and
a substrate side end portion of the second dielectric layer included in the first metal layer is located between the one face of the substrate and the top part of the first metal layer.

2. The polarization device according to claim 1,
wherein the second dielectric layer includes a first member and a second member, and
the first and second members provided to the first metal layer overlap each other over the top part of the first metal layer.

3. The polarization device according to claim 2,
wherein the first metal layer is provided at one end side of the substrate,
a second metal layer among the plurality of metal layers is provided at the other end side of the substrate,
a volume per unit length of the first member provided to the first metal layer is larger than a volume per unit length of the first member provided to the second metal layer, and
a volume per unit length of the second member provided to the first metal layer is smaller than a volume per unit length of the second member provided to the second metal layer.

4. The polarization device according to claim 2,
wherein the plurality of metal layers is formed of a material selected from aluminum, silver, copper, chrome, titanium, nickel, tungsten, and iron,
the first dielectric layer is formed of an oxide of the plurality of metal layers, and
the second dielectric layer is formed of a material selected from silicon, germanium, molybdenum, and tellurium.

5. The polarization device according to claim 4,
wherein the first and second members are formed of the same material to each other.

6. The polarization device according to claim 1,
wherein in a region between the plurality of metal layers, a groove is formed in the substrate.

7. A method of manufacturing a polarization device including a substrate, a plurality of metal layers provided on one face of the substrate in a stripe shape, a first dielectric layer provided on a surface of one metal layer among the plurality of metal layers, and a second dielectric layer that is provided on the first dielectric layer and includes a first member and a second member, the method comprising:

forming the first dielectric layer by oxidizing a surface of the plurality of metal layers provided on one surface of the substrate in an oxide gas atmosphere;

forming the first member by depositing a material of the first member on the first dielectric layer from a first direction opposite to one side face among a plurality of side faces of the one metal layer; and forming the second member by depositing a material of the second member as an upper layer of the first dielectric layer from a second direction opposite to the other side face opposite to the one side face among the plurality of side faces of the one metal layer.

8. The method according to claim 7,
wherein in the forming of the first member, the material of the first member is deposited on the first dielectric layer so that a substrate side end portion of the first member is located between the one face of the substrate and the top part of the one metal layer, and in the forming of the second member, the material of the second member is deposited as the upper layer of the first dielectric layer so that a substrate side end portion of the second member is located between the one face of the substrate and the top part of the one metal layer.

9. The method according to claim 7,
wherein in the forming of the second member, the second member is formed so that the second member overlaps the first member over the top part of the one metal layer.

10. The method according to claim 7,
wherein a first metal layer among the plurality of metal layers is provided at one end side of the substrate, a second metal layer among the plurality of metal layers is provided at the other end side of the substrate, a volume per unit length of the first member provided to the first metal layer is larger than a volume per unit length of the first member provided to the second metal layer, and a volume per unit length of the second member provided to the first metal layer is smaller than a volume per unit length of the second member provided to the second metal layer.

11. The method according to claim 7,
wherein the plurality of metal layers is formed of a material selected from aluminum, silver, copper, chrome, titanium, nickel, tungsten, and iron, the first dielectric layer is formed of an oxide of the plurality of metal layers, and the second dielectric layer is formed of a material selected from silicon, germanium, molybdenum, and tellurium.

12. The method according to claim 7,
wherein the first and second members are formed of the same material to each other.

13. The method according to claim 7,
wherein the oxide gas is an ozone gas.

14. The method according to claim 7,
wherein in the forming of the dielectric layer, ultraviolet light is emitted.

15. The method according to claim 7, further comprising:
forming a groove in the substrate, in a region between the plurality of metal layers.

16. A projection type display apparatus, comprising:
a light source;
a liquid crystal electro-optical device to which light emitted from the light source is incident;
a projective optical system that allows light passed through the liquid crystal electro-optical device to be incident to a surface to be projected; and
the polarization device according to claim 1 provided at least one of between the light source and the liquid crystal electro-optical device on an optical path of the light emitted from the light source and between the liquid crystal electro-optical device and the projective optical system on an optical path of the light passed through the liquid crystal electro-optical device.

17. A projection type display apparatus, comprising:
a light source;
a liquid crystal electro-optical device to which light emitted from the light source is incident;
a projective optical system that allows light passed through the liquid crystal electro-optical device to be incident to a surface to be projected; and
the polarization device according to claim 2 provided at least one of between the light source and the liquid crystal electro-optical device on an optical path of the light emitted from the light source and between the liquid crystal electro-optical device and the projective optical system on an optical path of the light passed through the liquid crystal electro-optical device.

18. A liquid crystal device, comprising:
a liquid crystal layer interposed between a pair of substrates; and
the polarization device according to claim 1, which is interposed between at least one substrate among the pair of substrates and the liquid crystal layer.

19. A liquid crystal device, comprising:
a liquid crystal layer interposed between a pair of substrates; and
the polarization device according to claim 2, which is interposed between at least one substrate among the pair of substrates and the liquid crystal layer.

20. An electronic apparatus comprising:
the liquid crystal device according to claim 18.

21. The polarization device according to claim 1,
wherein the plurality of metal layers is formed of a material selected from aluminum, silver, copper, chrome, titanium, nickel, tungsten, and iron, the first dielectric layer is formed of an oxide of the plurality of metal layers, and the second dielectric layer is formed of a material selected from silicon, germanium, molybdenum, and tellurium.

* * * * *